United States Patent Office
3,235,497
Patented Feb. 15, 1966

3,235,497
LUBRICATING COMPOSITIONS CONTAINING MULTI-FUNCTIONAL ADDITIVES
Richard J. Lee, Park Forest, Ill., assignor to Standard Oil Company, Chicago, Ill., a corporation of Indiana
No Drawing. Filed Aug. 23, 1962, Ser. No. 218,846
18 Claims. (Cl. 252—46.7)

This invention relates to a new class of imide derivatives of cyclic acid anhydrides having a carbon-to-carbon unsaturation in the cyclic acid anhydride ring wherein there is attached to one of said ring carbon atoms an alkoxy alkylthiophosphono group. More specifically then, this invention pertains to alkoxy alkylthiophosphono cyclic acid imides, their preparation and their use in lubricant compositions.

Various alkyl or alkenyl succinimides and amino succinimides have been proposed as lubricant additives. They have been proposed as so-called ashless dispersant additives for lubricant oils used to lubricate internal combustion engines because the succinimides and amino succinimides leave little or no ash when consumed in the combustion chamber. These succinimides and amino succinimides can be illustrated by the following formulae, respectively:

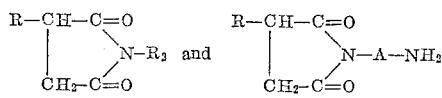

wherein R is an alkyl hydrocarbon group generally a higher alkyl hydrocarbon group such as a $C_{10}$ to $C_{7200}$ hydrocarbon group usually a branched chain hydrocarbon group, $R_2$ is the residue of a primary amine such as an alkyl group, a cycloalkyl group such as cycloheptane or cyclohexane, an aryl group such as the phenyl group or a heterocyclic group, and A is a divalent group such as the divalent alkyl groups: ethylene, propylene, butylene, etc., groups containing a plurality of $CH_2$ groups, a divalent arylene group such as the p-phenylene group, p-xylene group, naphthylene groups, biphenylene groups, etc., derived from diamines as well as such groups containing additional amino groups, generally secondary amino groups wherein —A—$NH_2$ is the residue of a linear polyamine. The foregoing succinimides and amino succinimides are prepared by reacting a large alkyl hydrocarbon usually a polymer of propene of butene having 10 to 7200 carbon atoms (molecular weight up to about 100,000) with maleic anhydride to form an alkyl-substituted succinic anhydride which is then reacted with the appropriate primary amine, primary diamine or linear polyamine containing at least one primary amino group.

While such alkyl-substituted succinimides and alkyl-substituted amino succinimides have dispersant properties for lubricating oils, especially as low-temperature dispersants, they in and of themselves do not function as a multi-purpose lubricant additive. There should be also added to the lubricating oil phosphorus-containing compounds to provide some lead scavenging in the combustion chamber. Also the alkyl succinimides and alkyl amino succinimides do not provide for inhibition of oxidation of the lubricant oil over the temperature ranges encountered in the engine crankcase.

A new class of multi-functional lubricant additives containing amide, imide and amino-imide groups as well as phosphorus and combined or covalent sulfur has been discovered. This new class of lubricant oil additives is complex organic compounds or mixtures of organic compounds derived from the reaction of a phosphorus sulfide, e.g. phosphorus pentasulfide with a high boiling hydrocarbon, as hereinafter described in detail, to form a phosphosulfurized hydrocarbon product. The phosphosulfurized hydrocarbon product is in turn reacted with an alcohol to form an O-ester of a hydrocarbon thio acid of phosphorus, which when the phosphorus sulfide reactant was $P_2S_5$ and one mole of alcohol per phosphorus atom is reacted can be illustrated by the following structural formula:

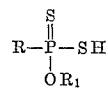

wherein R is the hydrocarbon portion derived from the reaction of phosphorus pentasulfide with the high boiling hydrocarbon and $OR_1$ is the group provided by the alcohol reactant. The foregoing O-ester of a hydrocarbon thio acid of phosphorus is reacted with an olefinically-unsaturated dicarboxylic acid or its anhydride to form a product which is then reacted with an amine containing one or more primary amino groups. The mechanism of the entire series of reactions is not completely understood since, for the purposes of the end use of the products of this invention, certain of the reaction steps need not be complete. For example, the reaction between the alcohol and the phosphosulfurized hydrocarbon hereinbefore illustrated as producing a single O-ester derivative can contain a mixture of compounds including O-esters of the foregoing type and also O-esters of the following type:

when the phosphosulfurized hydrocarbon was obtained from $P_2S_5$. Either of the foregoing O-esters will react with olefinically-unsaturated dicarboxylic acids or their esters. This reaction mixture not only contains the products of reaction between the O-esters and the unsaturated dicarboxylic acid or anhydride but can also contain unreacted O-ester reactant and unsaturated dicarboxylic acid or anhydride reactant. Thus, when last reacted with an amine containing one or more primary amino groups, the final reaction mixture will contain mixtures of amides, imides, amino-imides, amino-amides, amine salts, thio amides, etc.

However, the products of the process of this invention are useful additives for lubricating oils to impart detergency, corrosion-inhibition and oxidation inhibition to the resulting oil when present in from about 0.002 to about 15 percent by weight. The lubricant oil can be so prepared or a concentrate containing above 15 up to about 80 percent by weight of the final reaction product hereinbefore described in an oil-soluble diluent preferably in a light blending lubricant oil, such as SAE 5 oil.

The reaction products of this invention will hereafter be discussed in greater detail with respect to each step of their preparation; i.e. Hydrocarbon Phosphosulfurization, Formation of O-Ester of Alkyldithiophosphonic Acid, O-Ester-Unsaturated Dicarboxylic Acid Reaction and Neutralization with Amine.

HYDROCARBON PHOSPHOSULFURIZATION

The reaction of a phosphorus sulfide, such as $P_2S_3$, $P_4S_3$, $P_2S_5$ and $P_4S_7$, for example, and a high boiling hydrocarbon is known to those skilled in the art. The phosphosulfurized hydrocarbon can be suitably prepared by reacting 1 to 50% phosphorus sulfide by weight with the hydrocarbon at a temperature in the range of 150 to 600° F. for 1 to 10 hours. It is desirable to use an amount of phosphorus sulfide reactant that will completely react with the hydrocarbon so that no further purification is necessary. However, an excess of phosphorus sulfide reactant can be employed and unreacted materials separated as, for example, by filtration. It is advantageous to carry out the phosphosulfurization reaction in a non-oxidizing atmosphere in the reaction vessel to prevent premature hydrolysis of the reaction product. An atmosphere of nitrogen in the reaction vessel is satisfactory for this purpose.

For the purposes of this invention, it is preferred to carry out the hydrocarbon phosphosulfurization with $P_2S_5$ using from 5 to 25% thereof by weight based on the hydrocarbon. It is also preferred to carry out the phosphosulfurization reaction in the presence of a light oil diluent such as an SAE 5 oil or similar light lubricant blending oil to provide the phosphosulfurized hydrocarbon dissolved in the oil diluent so that the resulting solution contains 1 to 3% phosphorus by weight. The use of the diluent in this step is also advantageous for the reason that the ultimate product after amine neutralization is in the form of a concentrate which can be added to a single base oil or a blend of oils forming the base oil to provide a finished lubricant oil composition containing the additive of this invention.

The hydrocarbon reactant can be a $C_{10}$ to $C_{7200}$ hydrocarbon. The size of the hydrocarbon determines to some extent the oil solubility of the ultimate reaction product. Although the lower carbon content hydrocarbon reactant may cause the ultimate amine neutralized reaction product to be less soluble in mineral oils, such products are somewhat more soluble in synthetic lubricants such as, for example, ester-type lubricants, e.g., esters of polymeric acids and/or polyether-type lubricants of the polyalkylene oxide type, among other synthetic lubricants.

Suitably there may be employed as hydrocarbon reactants with $P_2S_5$ any natural or synthesized petroleum fraction providing a $C_{10}$ and above open chain hydrocarbon or $C_{10}$ or higher hydrocarbon fraction synthesized by polymerization of lower ($C_2$ to $C_5$) olefins by hydrocarbon synthesis gas processes and the like. Desirably the hydrocarbon reactant is a polymer of a mono-olefin or mixture of mono-olefin and isomono-olefin such as are prepared by the polymerization and/or copolymerization of mono-olefins and/or isomono-olefins in the presence of a catalyst such as sulfuric acid, phosphoric acid, boron trifluoride, aluminum bromide or chloride, or other similar halide catalysts of the Friedel-Crafts type. The preparation of such hydrocarbons is well known to those skilled in the art, for example, their preparation is described in U.S. Patents 2,316,082 and 2,316,088, each issued to Loane et al.

The hydrocarbons supplying the R group are preferably polymers of $C_2$ to $C_4$ mono-olefins, mixtures of polymers of mono-olefins with polymers of isomono-olefins or copolymers of mono-olefins and isomono-olefins having molecular weights corresponding to a carbon content of $C_{10}$ to $C_{7200}$, i.e., molecular weight of 140 to 100,000. Preferably the hydrocarbons have an average ebullioscopic molecular weight in the range of 300 to 50,000. Such polymers can be obtained by the aforementioned polymerization of ethylene, propene, isobutylene, butylenes or mixtures thereof as well as $C_4$ fractions containing isobutylene, butylenes and butanes.

Other desirable hydrocarbon sources for reaction with $P_2S_5$ are olefinic products having 20 or more carbon atoms of which 13 to 18 carbon atoms, e.g., 15 carbon atoms, are in a long chain. Such olefinic hydrocarbons can be obtained by the dehydrogenation of paraffins, cracking of paraffin waxes, dihydrohalogenation of halogenated paraffin waxes and the like.

The hydrocarbon reacted with $P_2S_5$ preferably is olefinic in nature but need not be more than mono-olefinic. The hydrocarbon is reacted with $P_2S_5$ suitably at a temperature in the range of from 150° F. to 600° F., preferably at 300 to 500° F. for about one to 10 hours. It is preferable to use an amount of $P_2S_5$ that will completely react with the hydrocarbon so that further purification of the reaction product is not required; however, an excess of $P_2S_5$ can be used and the unreacted material separated by filtration. It is advantageous to carry out the hydrocarbon $P_2S_5$ reaction in a non-oxidizing atmosphere, e.g., nitrogen atmosphere. No hydrolysis of the reaction product occurs under the foregoing conditions. This reaction produces the class of phosphosulfurized hydrocarbons illustrated in Reaction I.

FORMATION OF O-ESTER OF ALKYLDITHIOPHOSPHONIC ACID

The foregoing phosphosulfurized product is reacted with a monohydroxy alcohol in an amount equal to one mole of monohydroxy alcohol per phosphorus atom present. Suitable monohydroxy alcohols, $R_1OH$, include $C_1$ to $C_{20}$ alkanols such as methanol, ethanol, isopropanol, n-propanol, the butanols, the pentanols, the hexanols, the heptanols, the octanols, the decanols, the dodecanols, the $C_{14}$ alcohols including lauryl alcohol, the $C_{15}$ to $C_{18}$ alcohols including those derived from the animal and vegetable oil fatty acids and the like; cycloaliphatic alcohols such as cyclopentanol, methyl cyclopentanol, ethyl cyclopentanol, cyclohexanol, methyl cyclohexanol, ethyl cyclohexanol, diethyl cyclohexanol, and the like; aryl-substituted alkanols such as benzylalcohol, phenethylalcohol, 1-phenyl-3-propanol, 1-phenyl-2-propanol, 2-phenyl-2-propanol, 2-phenyl-2-hexanol, 1-naphthalene ethanol, among others; heterocyclic alcohols such as furfuryl alcohol, among others; diols such asethylene glycol, 1,2-propanediol, 1,3-propanediol, o-, m- and p-phenylene dimethanol, 1,5-naphthalenedimethanol, 4,4'-biphenyldimethanol, and the like having the formula $HO-CH_2-(Y)_n-CH_2-OH$ wherein Y is $CH_2$ or a divalent aromatic hydrocarbon group and $n$ is 0 to 18 when Y is $CH_2$ and is 1 to 2 when Y is an aromatic hydrocarbon divalent group, i.e., 2 joined or fuzed aromatic rings; and alcohols containing other functional groups such as nitro, cyano, ethynyl, etc. groups. Preferably the alcohols should not be acidic in nature as are the hydroxy aromatics, e.g., phenol, cresols, naphthols, hydroxythiazoles and thiazolines, thiophene-ols and the like. The residue of the alcohol can be varied depending upon the nature of its hydrocarbon group. Thus, the alcohol reactant can be selected to provide enhanced solubility in hydrocarbons where the alkyl group resulting from the $P_2S_5$ reaction with the hydrocarbon would otherwise provide marginal solubility of the amine neutralization product in the lubricant oil. To prepare compounds of this invention for use as lubricating oil additives for internal combustion engines, the preferred alcohols are $C_6$ to $C_{12}$ alkanols. For their detergency properties in other oils such alcohols can be used as the lower alkanols, cyclohexane and the like.

The reaction of the alcohol and the phosphosulfurized hydrocarbon can suitably be carried out at temperatures of from 100 up to 500° F., desirably 200 to 400° F. and preferably 300° F., which temperatures may be above the boiling point of the alcohol. Loss of the alcohol reactant can be prevented by carrying out the reaction in a reactor equipped with a reflux condenser. The alcohol may be added to the mixture resulting from the hydrocarbon $P_2S_5$ reaction in the same reaction equipment or the hydrocarbon $P_2S_5$ reaction product transferred hot to a second reactor without filtration if the $P_2S_5$ has all been reacted or with filtration if excess $P_2S_5$ is employed and there combined with the amount of alcohol required as indicated by the phosphorus content of the reaction product. Preferably one mole of a mono-ol (alcohol with one hydroxy group) is reacted per equivalent of phosphorus. However, slightly less, in the range of 0.5 to 1.0 mole of alcohol per equivalent of phosphorus, can be used for the resulting ester products are reactive with the unsaturated dicarboxylic acids. Preferably the reaction of the phosphosulfurized hydrocarbon with alcohol is accomplished at a temperature in the range of 300–100° F. since these temperatures are available from the first reaction involving the preparation of the phosphosulfurized hydrocarbon. The use of an excess of alcohol over the one mole per equivalent of phosphorus, up to a 50% excess, is employed when it is desired to insure complete reaction. The excess alcohol can be readily removed by evaporation and/or distillation and recovered for recycle. Substantially anhydrous reaction conditions are preferred to retain the sulfur atoms in the product. The use of an inert gas atmosphere for example, a nitrogen atmosphere, is preferred. The product now is the O-ester of the alkyldithiophosphonic acid. The removal of unreacted alcohol is, in any case, preferred for by so doing undesired side reactions in the next step are substantially eliminated.

O-ESTER-UNSATURATED DICARBOXYLIC ACID REACTION

The reaction between the O-ester of alkyldithiophosphonic acid and the unsaturated dicarboxylic acid such as maleic acid, glutaconic acid, α-hydromuconic acid, β-hydromuconic acid, 2-octenedioic acid, 3-hexynedioic acid and anhydride of such acids, preferably maleic anhydride, dimethyl maleic anhydride and the other cyclic anhydrides of acids containing a single ethylenic unsaturation desirably is conducted above the melting point but below the thermal decomposition temperature of the cyclic anhydride. Since anhydrides of ethylenically unsaturated dicarboxylic acids other than maleic acid are of academic interest, being theoretically capable of existence or otherwise unobtainable for commercial use, the derivatives of commercial preference are those of maleic anhydride, methyl maleic anhydride and dimethyl maleic anhydride reactants. For the preparation of O-ester alkyldithiophosphonic acid derivatives of these maleic acid anhydrides desirable reaction temperatures are in the range of from 140° F. to about the thermal decomposition temperature of the anhydrides, i.e. about 500° F. Preferably, the reaction temperature is in the range of 200 to 500° F. The reaction is carried out for 1 to 4 hours.

The reaction between the O-ester of alkyldithiophosphonic acid and the maleic anhydrides involves an additional reaction resulting in the formation of O-ester alkyldithiophosphono succinic anhydride products. To retain the sulfurs in the ultimate product, it is preferred that the reaction be conducted with substantially anhydrous reactants. Generally, heating the anhydride to melt it and to provide commercially feasible reaction rates, 200 to 500° F., will provide a substantially anhydrous reaction condition. This reaction can be carried out in the presence of an inert atmosphere.

The amount of maleic anhydrides employed in this step is related to the —SH group acidity. Desirably, 0.75 to 1.0, preferably 1.0, mole of maleic anhydride is employed per mole of —SH acidity. This —SH acidity can be readily determined by any suitable analytical method. The proportion of reactants, however, is not critical. Using less than molecular equivalents of maleic acid anhydrides results in the presence of unreacted O-ester of alkyldithiophosphonic acid in the product. The use of more than equimolecular proportions of maleic anhydrides results in the presence of unreacted anhydride in the product; however, the unreacted maleic anhydrides in the product may be more readily removed than unreacted O-ester of alkyldithiophosphonic acid. In the first case where less than equimolecular proportions of maleic anhydrides are employed and free O-ester of alkyldithiophosphonic acid is present in the product, it need not be removed when the ultimate amine neutralization product is to be employed as an additive for internal combustion engine lubricants for the amine salt or reaction product of said dithiophosphonic acid with its phosphorus and sulfur content as well as the amine residue will not be deleterious and even provide additional benefits. Likewise the amine neutralization product of unreacted maleic anhydride reactant has some detergency properties. However, for maximizing detergency for crankcase lubricant formulations, e.g., to obtain low sludge deposit formations or high sludge ratings, the stoichiometric relationship between —SH acidity and maleic anhydride reactant is preferred.

NEUTRALIZATION WITH AMINE

The O-ester alkyldithiophosphonic acid-maleic anhydride reaction products are lastly reacted with an amine containing one or more primary amino groups or linear polyamine containing at least one primary amino group. Here again where variations in hydrocarbon solubility and/or detergency are desired, the choice of primary amino containing reactant can be varied. By choosing a primary amino containing reactant which also contains secondary and tertiary amino groups as in the linear polyamines the detergency properties of the ultimate product are enhanced. Also, the hydrocarbon solubility may be enhanced by the presence of ether linkages in the linear polyamine as, for example, in reaction products of alkylene oxide with di- and tri-$NH_2$ compounds with the polyamine reactant used in molar excess with respect to the alkylene oxide, e.g., ethylene oxide, propylene oxide, etc., to provide terminal —$NH_2$ groups.

The neutralization of the reaction product of the maleic anhydrides and the O-ester of alkyldithiophosphonic acid with the primary amino containing reactant is carried out at a temperature whereby the by-product, water and $H_2S$, formed is removed. Blowing or stripping with an inert gas, e.g., $N_2$, $CO_2$, air, etc. may be used to remove by-product water, especially at temperatures below 200 to 212° F. Reduced pressure, below atmospheric pressure, may also be employed for removal of by-product water. However, the reaction can be carried out desirably at temperatures in the range of from the atmospheric boiling point of water, 200 to 212° F. to about 450° F. The primary amino reactant may be added at one time in amounts at least equivalent to form the imide of the corresponding acid anhydride. Greater amounts of primary amino containing reactant may result in the formation of the diamide. Lesser amounts of primary amino containing reactant when only one —$NH_2$ group is present leaves, of course, unreacted anhydride and/or acidic groups, if present. When more than one mole of primary amino containing reactant is employed per mole of maleic anhydride reaction product, there may be produced a di or higher amide product. By incremental or slow addition of the primary amino containing reactant which also contains more than one —$NH_2$ group there is always an excess of maleic anhydride reaction product present and corresponding amino-imide (unreacted —$NH_2$ group) products form.

Suitable amines include primary alkyl monoamines, primary cycloalkylamines, primary arylamines, primary alkarylamines, N-heterocyclic primary amines, primary aralkylamines, alkylene diamines, arylene diamines, cycloalkenyl diamines, linear polyamines and the like. These amines contain no reactive groups other than the amino groups, and are free from olefinic unsaturation. Illustrative primary amino containing reactants include methylamine, ethylamine, n-propylamine, isopropylamine, n-butylamine, isobutylamine, sec.-butylamine, n-amylamine, isoamylamine, sec.-amylamine, n-hexylamine, 2,2-dimethylbutylamine, 2-ethylbutylamine, n-heptylamine, decylamines, dodecylamines, laurylamine, stearylamines ($C_{18}H_{37}NH_2$), cyclohexylamine, 4-methylcyclohexylamines, cyclopentylamine, 3-methylcyclopentylamine, aniline, m-toluidine, 2,3-xylidine, mesidine, 1-naphthylamine, 1-fluorenamine, xenylamine, 2-furanamine, 2-p-dioxanamine, 3-gamma-pyranylamine, benzylamine, phenethylamine, furfurylamine, 1-naphthylenemethylamine, 1-indanethylamine, ethylene diamine, propane diamines, butane diamines, dialkylaminoalkylamines, such as dimethylaminomethylamine, dimethylaminoethylamine, dimethylaminopropylamine, dimethylaminobutylamine, dimethylaminoheptylamine, diethylaminoethylamine, diethylaminoethylamine, diethylaminopropylamine, diethylaminoamylamine, dipropylaminopropylamine, methylpropylaminoamylamine, propylbutylaminoethylamine; linear polyamines such as diethylenetriamine, triethylenetetramine, heptaethyleneoctamine, tetraethylenepentamine, di-(methylethylene) triamine, hexapropyleneheptamine, tri-(ethylethylene) tetramine, penta-(1-methylpropylene)-hexamine, tetrabutylenepentamine, hexa-(1,1-dimethylethylene) heptamine, di-(1-methylbutylene) triamine, pentaamylenehexamine, tri-(1,2,2-trimethylethylene) tetramine, di(1-methylamylene) triamine, tetra-(1,3-dimethylpropylene) pentamine, penta-(1,5-dimethylamylene) hexamine, di-(1-methyl-4-ethylbutylene) triamine, penta-(1,2-dimethyl-1-isopropylethylene) hexamine, tetraoctylenepentamine, tri-(1,4-diethylbutylene) tetramine, tridecylenetetramine, tetra-(1,4-dipropylbutylene) pentamine, didodecylenetriamine, tetra-tetradecylenepentamine, penta-(1-methyl-4-nonylbutylene) hexamine, tri-(1,5-dimethylpentadecylene) tetramine, trioctadecylenetetramine, dieicosylenetetramine, di-(1,2-dimethyl-14-nonyltetradecylene) triamine, di-(1,18-dioctyloctadecylene) triamine, penta-(1-methyl-2-benzylethylene) hexamine, tetra-(1-methyl-3-benzylpropylene) pentamine, tri-(1-methyl-1-phenyl-3-propylpropylene) tetramine, and tetra-(1-ethyl-2-benzylethylene) pentamine; N-(beta-aminoalkyl piperazines such as N-methyl-N'-(beta-aminoethyl) piperazine, N-isopropyl-N'-(beta-aminoethyl) piperazine and N-(beta-aminoisopropyl) piperazine, among others.

The O-ester of alkyldithiophosphonic acid can be reacted with pre-formed succinimide or the imides of other dicarboxylic acids or their anhydrides obtained by methods well known to those skilled in the art. To conserve the dithiophosphonic acid reactant it may be desirable to employ as the dicarboxylic acid imide such reactants as are free from reactive sites which will react with or combine with the O-ester of alkyldithiophosphonic acid reactant.

It will be appreciated that the neutralization reaction can produce a mixture containing both the imide of the dicarboxylic acid reactant and the diamide of the dicarboxylic acid reactant rather than a single compound. Thus, generically speaking, the ultimate products of this invention are reaction products produced as hereinbefore described.

The preparation of illustrative members of the new class of reaction products will be hereinafter described in detail. These reaction products are not only useful as ashless detergents or dispersing agents for lubricating oils, but also may be used as corrosion inhibitors in gasoline, diesel fuel, heating fuel, petroleum refinery streams, during the use, transportation and storage thereof.

*Example 1*

In a reactor having a stirrer there is charged 2392 grams of viscous liquid polybutene having a viscosity of 3000 SUS at 210° F. and 308 grams $P_2S_5$. The resulting mixture is stirred, heated to 450° F. and held at 450° F. for 5 hours. The reaction mixture comprises 2700 grams of phosphosulfurized polybutene of 3.2% phosphorus content.

A 1000 gram portion of the foregoing phosphosulfurized product and 600 grams of SAE 5W oil are combined and heated to 300° F. in a reaction vessel. Then 130 grams of iso-octyl alcohol are added with stirring and the mixture held at 300° F. for 60 minutes. An aliquot of the resulting product is taken and —SH acidity determined for determination of amount of maleic anhydride reactant to employ.

To the foregoing alcohol-phosphosulfurized hydrocarbon reaction product there is added 90 grams of maleic anhydride and this mixture is heated to 300° F. with stirring and held at 300° F. for 60 minutes.

Thereafter a mixture of 130 grams of tetraethylene pentamine in 400 grams of SAE 5W oil is added over a 30 minute period. Little heat or reaction is observed. The resulting mixture is heated at 300° F. for 3 hours. The resulting amine neutralization product is a concentrate containing about 70% amine neutralization product in SAE 5W oil and contains 1.53% phosphorus, 1.46% sulfur and 1.93% nitrogen.

*Example 2*

A mixture of 1000 grams of polybutene having a viscosity of 300 SUS at 210° F. and 1000 grams of polybutene having a viscosity of 15000 SUS at 210° F. is reacted with 208 grams of $P_2S_5$ at 450° F. for 5.5 hours and then diluted with 700 grams of SAE 5 oil. The diluted reaction mixture contains 2% phosphorus and amounts to 2708 grams.

A 1600 gram portion of the foregoing 2% p product is reacted with 130 grams iso-octylalcohol (oxo alcohol) at 300° F. for 60 minutes and then heated at 400° F. for 30 more minutes to remove unreacted alcohol.

As the —SH acidity determination indicates, 49 grams of maleic anhydride are added to the alcohol reaction product. The maleic anhydride dissolves at 200° F. This reaction mixture is held at 300° F. for 60 minutes and thereafter stripped of unreacted maleic anhydride with nitrogen at 300° F.

To the foregoing maleic anhydride reaction product there is added 63 grams of tetraethylene pentamine at 300° F. This mixture is reacted at 300° F. for 10 hours. The resulting product contains 1.26% nitrogen, 1.61% sulfur and 1.87% phosphorus and is a 70% concentrate of the amine neutralization product in SAE 5 oil.

*Example 3*

There is first reacted at 450° F. for 5.5 hours:

370 grams $P_2S_5$
1000 grams polybutene, 3000 SUS at 210° F.
1000 grams polybutene, 15000 SUS at 210° F.

and the resulting mixture diluted with 1763 grams SAE 5W oil to 2 mole percent phosphorus to give 4133 grams of this product.

A 1600 gram portion of the foregoing 4133 grams is reacted with 130 grams octyl alcohol at 300° F. for 60 minutes and then at 400° F. for 30 minutes during which latter time unreacted alcohol is distilled off.

There is reacted with the alcohol reaction product 49 grams of maleic anhydride at 200° F. for 60 minutes. Unreacted maleic anhydride is stripped out at 300° F. with nitrogen.

To the maleic anhydride reaction product is added 47 grams of tetraethylene pentamine and this mixture is reacted at 300° F. for 10 hours. The resulting product contains 70% amine neutralization product in the SAE 5W oil.

*Example 4*

There is first reacted at 450° F. for 5.5 hours:

370 grams $P_2S_5$
1000 grams polybutene (viscosity 3000 SUS at 210° F.)
1000 grams polybutene (viscosity 15000 SUS at 210° F.)

and the resulting mixture diluted with 1763 grams SAE 5W oil to 2 mole percent phosphorus producing 4000 grams of this diluted product.

A 1600 portion of the foregoing diluted product is reacted with 130 grams iso-octyl alcohol at 300° F. for 30 minutes and then at 400° F. unreacted iso-octyl alcohol is removed by distillation.

To the foregoing alcohol reaction product maleic anhydride in an amount equal to the stoichiometric —SH acidity (determined as equivalent to 45 mg. KOH per gram of oil solution of alcohol reaction product) and the reaction is carried out at 200° F. for one hour. Thereafter unreacted maleic anhydride is stripped out at 300° F. with a nitrogen stream injected into the fluid mass.

To the foregoing maleic anhydride reaction product at 300° F. there is added 47 grams of tetraethylene pentamine (0.5 mole per mole of acidity equivalent) and reaction is conducted at 300° F. for 10 hours. The resulting product is a concentrate containing 60% by weight of the ultimate amine neutralization product in the SAE 5W oil. This concentrate contains 2.1% p, 2.2% s and 0.9% n.

*Example 5*

There is first reacted:

750 grams polybutene, viscosity 3000 SUS at 210° F.
1500 grams polybutene, viscosity 15000 SUS at 210° F.
305.25 grams $P_2S_5$ at 465° F. for 7 hours. The resulting mixture is diluted with 1707 grams SAE 5W oil.

Next a 1600 gram portion of the foregoing reaction product is reacted with 130 grams of iso-octyl alcohol under reflux conditions at 300° F. for one hour and then at 400° F. for 30 minutes whereby 76 grams alcohol are distilled off.

The alcohol reaction product is combined with 49 grams maleic anhydride at 200° F. and this mixture reacted for 60 minutes at 300° F. Thereafter unreacted maleic anhydride is stripped out at 300° F. with nitrogen. The unreacted maleic anhydride amounts to 13 grams. To the maleic anhydride reaction product there is added 69 grams of tetraethylene pentamine and this mixture is heated at 300° F. for 10 hours. The resulting amine neutralization product is a concentrate of about 63% in the SAE 5W oil and contains 1.21% nitrogen, 1.65% sulfur and 1.77% phosphorus.

*Example 6*

A polybutene-$P_2S_5$ reaction product diluted with SAE 5W oil to 2.3% phosphorus content is prepared as hereinbefore described. To 2700 grams of this reaction product in the 5W oil there is added 632 grams of decyl alcohol and the resulting mixture is heated to 355 to 375° F. for 3 hours. The resulting alcohol reaction product is heated at reduced pressure to distill off unreacted alcohol. There is recovered 525 ml. of decyl alcohol leaving about 1.0 mole of alcohol reacted with the phosphosulfurized reaction product. This alcohol reaction product has an acidity corresponding to 18 mg. KOH per gram of product and contains 2.45% phosphorus and 1.66% sulfur.

The foregoing alcohol reaction product can be reacted with the indicated amount of maleic anhydride and tetraethyleneimine to prepare a concentrate of the amine-neutralized detergent suitable for dilution to a lubricant for internal combustion engines.

*Example 7*

To 1348 grams of hydrocarbon-$P_2S_5$ reaction product (prepared by reacting a high molecular weight polybutene hydrocarbon having a viscosity of 1000 SUS at 210° C. with $P_2S_5$) in SAE 5W oil and containing 1.0 mole phosphorus is added 130 grams octyl alcohol. The mixture is heated slowly for 2 hours to 380–385° F. and refluxed for 30 minutes. At end of 30 minutes little or no alcohol refluxing. The resulting alcohol reaction mixture is cooled to about 210° F. and 90 grams maleic anhydride is added. The maleic anhydride dissolved substantially immediately with stirring to form a clear solution.

The clear solution is heated to about 300° F. and then stripped with nitrogen. About 35 grams of unreacted maleic anhydride is collected. Thereafter 50 grams of tetraethylene pentamine is added and this mixture is heated to about 250° F. for 60 minutes. Upon cooling the amine-neutralization product is a clear solution containing 2.92% sulfur, 1.98% phosphorus and 1.035% nitrogen.

*Example 8*

A reaction product is prepared by the processes hereinbefore described by first reacting a polybutene hydrocarbon having a viscosity of 1000 SUS at 210° F. with $P_2S_5$ for about 3 hours at 450° F. followed by diluting the reaction product with solvent extracted SAE 5W oil to a 2% phosphorus content. Thereafter the hydrocarbon-$P_2S_5$ reaction product is reacted with iso-octyl alcohol. The resulting O-ester of the alkyldithiophosphorus acid is reacted with the amount of maleic anhydride corresponding to the —SH acidity value determined as hereinbefore described. The O-ester-maleic anhydride product is then reacted with tetraethylene pentamine as hereinbefore described. The resulting product contains 1.44% phosphorus. The moles employed per mole of phosphorus in the $P_2S_5$ reaction product is 1.0 mole maleic anhydride, 1.0 mole alcohol and 0.5 mole tetraethylene pentamine.

*Examples 9 to 12*

Crankcase lubricants are prepared from the reaction products of this invention, for Examples 9, 10 and 11, by combining on a percent-by-weight basis:

| | Percent |
|---|---|
| Solvent extracted SAE 20 base oil | 93.8 |
| Products of foregoing examples as indicated adjusted to 1.44% phosphorus by dilution | 5.0 |
| Zinc dialkyldithiophosphate prepared from a mixture of isopropanol and methyl isobutyl carbinol to provide the alkyl radicals | 1.2 |

For Example 13 the formulated lubricant contains:

| | Percent |
|---|---|
| Solvent extracted base oil blend: 40 SAE 5 and 43.35 SAE 10 | 83.35 |
| VI improver—polyisobutylene type | 10 |
| Pour-point depressor—naphthylene chlorinated wax condensation product | 0.15 |
| Product of Example 8 | 5.0 |
| Zinc dialkyldithiophosphate | 1.5 |

These lubricant compositions are tested in accordance with the procedure of the Lincoln M.S. Test Sequence V designed by Ford Motor Company. Briefly, the tests consists of using the combination of base oil and additive to be tested in a V–8 Lincoln engine under prescribed conditions. There is placed in the test engine crankcase 5 quarts of formulated test oil composition and the engine started and operated in a 4-hour cycle as follows:

| | Phase 1 | Phase 2 | Phase 3 |
|---|---|---|---|
| Duration | 45 min | 2 hr | 75 min. |
| Speed, r.p.m | 500 | 2,500 | 2,500. |
| Load, lbs | No load | (105 H.P.) | (105 H.P.). |
| Temperature, ° F.: | | | |
| Water Out | 115–120 | 125–130 | 170–175. |
| Oil Sump | 120–125 | 175–180 | 205–210. |
| A/F | 9.5 ±0.5 | 15.5 ±0.5 | 15.5 ±0.5 |

The 4-hour cycle is reset a total of 48 times (192 hours running time). After each 16 hours of operation the engine is shut down for 8 hours. Two-ounce samples of oil are taken every 30 hours and the oil level is adjusted with fresh oil to a level of 5 quarts. Added oil is weighed. At the time of the test, the hot oil is drained, weighted and recorded. The engine is then disassembled and tested for deposits of varnish and sludge among other observable results as set out in the table below.

LINCOLN SEQUENCE V TEST RESULTS

| Deposits | Ratings | | | |
|---|---|---|---|---|
| Locations | Example 9— prod. of example 7 | Example 10— prod. of example 5 | Example 11— prod. of example 1 | Example 12— prod. of example 8 |
| Varnish: | | | | |
| Piston [1] | 8.3 | 7.1 | 7.2 | 6.9 |
| Total [2] | 44.8 | 31.5 | 37.6 | 38.3 |
| Sludge: | | | | |
| Total [3] | 34.7 | 38.3 | 36.5 | 36.2 |
| Oil Screen Plugging, percent [4] | 5 | 0 | 0 | 2 |
| Oil Ring Plugging, percent [5] | 41 | 1 | 0 | 2 |

[1] A rating of 7.0 or higher is considered passing.
[2] Total of piston, rocker arm cover, cylinder walls and oil pan varnish ratings.
[3] 5/6% total of sludge in or on rocker arm assembly and cover, push rod cover, oil screen, oil pan, valve deck, push rod chamber and timing gear cover. A total sludge of 25 or higher is passing.
[4] 60% or lower is passing.
[5] 50% or lower is passing.

Each individual varnish and sludge deposit ratings on which the foregoing rating values are based are obtained by visual observation and the rating values are determined according to a scale of 1 to 10. The value of 10 being perfect indicating either no sludge or no varnish according to which is being rated and thus the lower the value below 10, the more sludge or varnish deposit. Following this rating system to its accumulative total, a rating of 50 for either total sludge or total varnish is perfect.

The fuels employed in the foregoing tests (Examples 9 to 12) contained the following percent sulfur:

| Example: | Percent sulfur in fuel |
|---|---|
| 9 | 0.06 |
| 10 | 0.08 |
| 11 | 0.08 |
| 12 | 0.08 |

As indicated by the formulation of the test lubricant for Example 12 (a multi-grade 10W 30 premium oil), other additives can also be employed with the products of this invention. The amounts of the other additives can be varied according to their efficiency to function as viscosity index improvers, anti-wear agents, pour-point depressors, rust and corrosion inhibitors, anti-oxidants, etc.

To summarize the preferred proportions of reactants for preparing lubricant additives having highly efficient detergency according to this invention, the phosphosulfurized hydrocarbon reactant is one prepared from 2 gram atoms of phosphorus in $P_2S_5$ per mole of hydrocarbon (one mole $P_2S_5$ per mole of hydrocarbon), unreacted alcohol is removed from the product of the reaction of the phosphosulfurized hydrocarbon and alcohol in the light blending oil diluent, an amount of maleic anhydride reactant is used in a proportion stoichiometrically equivalent to the —SH acidity of the alcohol-phosphosulfurized hydrocarbon reaction product or, if excess maleic anhydride reactant over the stoichiometric equivalent is added, such excess is removed, and an amount of primary amino reactant is employed to neutralize the acid moiety of the maleic anhydride reactant either forming the imide or the diamide product thereof.

What is claimed is:

1. A product of the reaction between a phosphosulfurized hydrocarbon, a $C_1$ to $C_{20}$ monohydroxy alcohol, an unsaturated dicarboxylic acid reactant selected from the class consisting of unsaturated dicarboxylic acids and their anhydrides, and a primary amine obtained by first reacting a phosphosulfurized $C_{10}$ to $C_{7200}$ hydrocarbon with a $C_1$ to $C_{20}$ monohydroxy alcohol in an amount in the range of from 0.5 to 1.0 mole per equivalent of phosphorus in said phosphosulfurized hydrocarbon at a temperature of from 100 to 500° F. to form an O-ester of an alkylthiophosphonic thio acid, reacting said O-ester with said unsaturated dicarboxylic acid reactant at 200 to 500° F. in an amount of from 0.75 to 1.0 mole per mole of —SH acidity of said O-ester of alkylthiophosphonic thio acid, reacting the product of said O-ester and said unsaturated dicarboxylic acid reactant with a primary amine at a temperature in the range of from 200 to 450° F. in an amount of at least one-half mole equivalent of —$NH_2$ in said amine for each —COOH group of said dicarboxylic acid reactant.

2. The product of claim 1 wherein the phosphosulfurized hydrocarbon is a derivative of $P_2S_5$ and a polymer of a $C_2$ to $C_4$ monoolefin hydrocarbon having an average ebullioscopic molecular weight in the range of 300 to 50,000.

3. The product of claim 1 wherein the phosphosulfurized hydrocarbon is a derivative of $P_2S_5$ and a $C_{10}$ to $C_{7200}$ hydrocarbon, the alcohol reactant is a $C_6$ to $C_{12}$ alkanol, the unsaturated dicarboxylic acid reactant is maleic anhydride and the primary amine reactant is tetraethylene pentamine.

4. The product obtained by (a) reacting phosphosulfurized hydrocarbon reactant consisting of viscous liquid polybutene reacted with $P_2S_5$ diluted with a light blending lubricant oil to a phosphorus content of 1 to 3% with a $C_6$ to $C_{12}$ alkanol in an amount to provide a 50% excess over 1.0 mole of said alkanol per equivalent of phosphorus at a reaction temperature of from 200 to 400° F. and distilling unreacted alkanol from said reaction product to form O-($C_6$ to $C_{12}$) alkyl ester of alkyldithiophosphonic acid in light mineral oil diluent; (b) reacting the O-($C_6$ to $C_{12}$) alkyl ester of alkyldithiophosphonic acid with maleic anhydride in an amount to provide 0.75 to 1.0 mole maleic anhydride per mole of —SH acidity of O-($C_6$ to $C_{12}$) alkyl ester of alkyldithiophosphonic acid in the range of 200 to 500° F. and stripping unreacted maleic anhydride from the reaction mixture at a temperature in the range of 200 to 500° F. with nitrogen; and neutralizing the maleic anhydride —O-($C_6$ to $C_{12}$) alkyl ester of alkyldithiophosphonic acid reaction product in light mineral oil with tetraethylenepentamine in an amount of from 0.5 to 1.0 mole per equivalent of phosphorus in said O-($C_6$ to $C_{12}$) ester-maleic anhydride reaction product at 300° F.

5. The product of claim 4 wherein the $C_6$ to $C_{12}$ alkanol is a $C_8$ alkanol.

6. The product of claim 4 wherein the light blending lubricant oil is SAE 5W oil.

7. The product of claim 4 wherein the hydrocarbon phosphosulfurized with $P_2S_5$ is a viscous liquid polybutene having a viscosity of 1000 SUS at 210° F., the $C_6$ to $C_{12}$ alkanol is a $C_8$ alkanol and the light blending lubricant oil is SAE 5W oil.

8. The product of claim 4 wherein the hydrocarbon phosphosulfurized with $P_2S_5$ is a viscous liquid polybutene having a viscosity of 3000 SUS at 210° F., the $C_6$ to $C_{12}$ alkanol is a $C_8$ alkanol and the light blending lubricant oil is SAE 5W oil.

9. The product of claim 4 wherein the hydrocarbon phosphosulfurized with $P_2S_5$ is a viscous liquid polybutene having a viscosity of 15000 SUS at 210° F., the $C_6$ to $C_{12}$ alkanol is a $C_8$ alkanol and the light blending lubricant oil is SAE 5W oil.

10. The product of claim 4 wherein the hydrocarbon phosphosulfurized with $P_2S_5$ is a mixture of viscous liquid polybutenes consisting of from 0.5 to 2 parts of polybutene having a viscosity of 3000 SUS at 210° F. per part of polybutene having a viscosity of 15000 SUS at 210° F., the $C_6$ to $C_{12}$ alkanol is a $C_8$ alkanol and the light blending lubricant oil is SAE 5W oil.

11. A lubricant additive concentrate consisting essentially of the product of claim 1 in an amount of from 15 to 80 percent by weight in a light blending lubricant mineral oil.

12. The concentrate of claim 11 wherein the light blending lubricant mineral oil is SAE 5W oil.

13. A lubricant composition comprising a major proportion of a normally liquid lubricating mineral oil and from 0.002 to 15% by weight of the product of claim 1.

14. A lubricant composition comprising a major proportion of a normally liquid lubricant mineral oil and the product of claim 4 containing 1.44% phosphorus in an amount of 5% by weight of said lubricant composition.

15. A lubricant composition comprising a major proportion of a normally liquid lubricant mineral oil and the product of claim 7 containing 1.44% phosphorus in an amount of 5% by weight of said lubricant composition.

16. A lubricant composition comprising a major proportion of a normally liquid lubricant mineral oil and the product of claim 8 containing 1.44% phosphorus in an amount of 5% by weight of said lubricant composition.

17. A lubricant composition comprising a major proportion of a normally liquid lubricant mineral oil and the product of claim 9 containing 1.44% phosphorus in an amount of 5% by weight of said lubricant composition.

18. A lubricant composition comprising a major proportion of a normally liquid lubricant mineral oil and the product of claim 10 containing 1.44% phosphorus in an amount of 5% by weight of said lubricant composition.

References Cited by the Examiner
UNITED STATES PATENTS

| | | | |
|---|---|---|---|
| 2,630,451 | 3/1953 | Fletcher et al. | 252—46.7 X |
| 2,644,002 | 6/1953 | Hoegberg | 252—46.7 X |
| 2,689,258 | 9/1954 | McDermott | 252—46.6 X |
| 2,727,067 | 12/1955 | Craig et al. | 252—46.6 X |

DANIEL E. WYMAN, *Primary Examiner.*